(12) United States Patent
Barsness et al.

(10) Patent No.: US 8,020,164 B2
(45) Date of Patent: Sep. 13, 2011

(54) SYSTEM FOR DETERMINING AND REPORTING BENEFITS OF BORROWED COMPUTING RESOURCES IN A PARTITIONED ENVIRONMENT

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1664 days.

(21) Appl. No.: 11/316,243

(22) Filed: Dec. 22, 2005

(65) Prior Publication Data
US 2007/0150894 A1    Jun. 28, 2007

(51) Int. Cl.
*G06F 9/46* (2006.01)
*G06F 15/173* (2006.01)

(52) U.S. Cl. ........ 718/104; 718/100; 718/102; 718/105; 709/226

(58) Field of Classification Search ........ 718/100, 718/104, 105
See application file for complete search history.

(56) References Cited

U.S. PATENT DOCUMENTS

| | | | | |
|---|---|---|---|---|
| 5,875,464 A * | 2/1999 | Kirk | ............... | 711/129 |
| 6,691,067 B1 * | 2/2004 | Ding et al. | ............... | 702/186 |
| 7,028,301 B2 * | 4/2006 | Ding et al. | ............... | 718/104 |
| 7,140,020 B2 * | 11/2006 | McCarthy et al. | ........... | 718/104 |
| 7,523,454 B2 * | 4/2009 | Romero et al. | ............... | 718/105 |
| 7,657,675 B1 * | 2/2010 | Hoffman et al. | ............... | 710/60 |
| 7,694,303 B2 * | 4/2010 | Hahn et al. | ............... | 718/104 |
| 2002/0129082 A1 * | 9/2002 | Baskey et al. | ............... | 709/102 |
| 2002/0156824 A1 * | 10/2002 | Armstrong et al. | ........... | 709/104 |
| 2003/0084030 A1 * | 5/2003 | Day et al. | ............... | 707/3 |
| 2004/0168170 A1 * | 8/2004 | Miller | ............... | 718/104 |
| 2005/0193113 A1 * | 9/2005 | Kokusho et al. | ............. | 709/225 |
| 2006/0143617 A1 * | 6/2006 | Knauerhase et al. | ........ | 718/104 |

\* cited by examiner

*Primary Examiner* — Meng A An
*Assistant Examiner* — Tammy Lee
(74) *Attorney, Agent, or Firm* — Wood, Herron & Evans, LLP

(57) ABSTRACT

An apparatus, program product and method improve reporting of performance data in computing systems having uncapped partitions, or partitions that can borrow computer resources. A system measures or otherwise determines time of processor use or another metric that relates to the actual use of a computer resource by the uncapped logical partition. The metric is determined during a computer operation that may include a thread or job, and that may span an interval or period of intervals. The system uses the metric to estimate what the response time would have been if a capped logical partition was alternatively used. Information derived from this estimated response time is reported to the user.

17 Claims, 3 Drawing Sheets

SYSTEM FOR DETERMINING AND REPORTING BENEFITS OF BORROWED COMPUTING RESOURCES IN A PARTITIONED ENVIRONMENT

FIELD OF THE INVENTION

The present invention relates to computing systems, and more particularly, to reporting data relating to the use of processors, memory and other resources of computer systems.

BACKGROUND OF THE INVENTION

Computing applications depend upon the availability of processing resources for speed and efficiency. To this end, computing architectures such as the "virtual machine" design, developed by International Business Machines Corporation, share common processing resources among multiple processes. Such an architecture may conventionally rely upon a single computing machine having one or more physical controllers, or central processing units (CPU's). The CPU's may execute software configured to simulate multiple virtual processors.

Such multiprocessor environments support the conceptual practice of logical partitioning. Partitioning provides a programmed architecture suited for sharing computing assets. A partition may logically comprise a portion of a machine's CPU's, memory and other resources. As such, an administrator may allocate the same resources to more than one partition. Each partition may additionally host an operating system, in addition to multiple virtual processors. In this manner, each partition operates largely as if it is a separate computer.

To further increase performance, shared processor pools are often used in conjunction with logical partitions. These shared pools comprise a collection of designated processors accessible to a group of partitions. A logical partition assigned to a shared processor pool may be designated either capped or uncapped.

A capped partition cannot use more processing capacity from the pool than its predetermined limit, or allocation. This limit applies even if CPU's in the pool are idle. Capping thus ensures that a particular logical partition will not exceed its allocated usage, which is desirable in some circumstances.

An uncapped partition may utilize spare processing capability beyond its allocation, provided that it does not execute its tasks on physical processors outside its assigned processor pool. For instance, uncapped partitions can borrow CPU resources from other shared processor partitions that are not using all of their allocated CPU resources. Uncapped partitions thus allow unused CPU resources to be used by other partitions who need it, where they previously would have been idle and wasted.

While use of uncapped partition features present certain advantages to users, the reporting of that use can be a source of confusion. The automatic, transparent nature of uncapped partitions presents challenges to designers for reporting benefits realized by uncapped partitions in an understandable way. For instance, uncapped CPU utilizations can go over 100%, e.g., up to 1000%. Conventional tools for measuring the time it takes to complete a computer task, or response time, do not determine what the response time would have been had no CPU resource been borrowed.

Not knowing what the response times would be without the borrowed resource (and use of the uncapped partition feature) can lead to future sizing and capacity complications. For example, a system administrator may be unaware that the dedicated capacity for particular partition is becoming inadequate for a partition experiencing increased workload. That partition may instead accomplish its disproportionately large workload by continuing to borrow more resources from other partitions. Eventually, excessive borrowing may drain the resource pool for other partitions and tasks, while slowing and otherwise burdening the entire system. For example, even if the workload in one partition does not increase, but the workload of one or more partitions grow to the point of utilizing all of their CPU resources, the response times in the uncapped partition will suffer due to not being able to borrow CPU resources any more. This scenario can also lead to unanswerable questions regarding the variability of response times, even though the amount of work being done on an uncapped partition is consistent due to varying amounts of borrowed resources.

Without adequate warning, the administrator may fail to acquire or reconfigure system resources in time to prevent efficiency and other processing problems. There is consequently a need for an improved manner of reporting performance data in computing systems having uncapped processing capabilities.

SUMMARY OF THE INVENTION

The present invention provides an improved apparatus, method and program product configured to improve reporting of performance data in computing systems having uncapped partitions. In some embodiments consistent with the invention, a system determines time of processor use or another metric that relates to the actual use of a computer resource by the uncapped logical partition. The metric is determined during a computer operation that may include a thread or job, and that may span an interval, or period of intervals. The system uses the metric to estimate what the response time would have been if a capped logical partition was alternatively used, i.e., what the response would have been were resources not borrowed from other partitions. Information derived from this estimated response time is reported to the user.

To assist in the determination of the estimated response time, a system may determine an increase factor. For instance, the program code of a system may divide a measurement of processor use for an interval by an amount of a partition's allocated processor capacity. In another example, a system may divide the total processor usage for a period by the number of intervals in the period to determine the increase factor. The estimated response time may then be determined using the product of the increase factor and the metric. Where appropriate, a wait time component and a scaled weighting factor based on partition priority may additionally be used to determine the estimated response time.

The metric used in the determination may include information relating to at least one of: processor usage, a processor time component, a wait time component, memory usage, an I/O resource and a disk resource. For comparison purposes, a system may additionally determine and/or report the actual response time for the computer operation using the uncapped logical partition.

System features allow users to be proactive in recognizing how much uncapped resource utilization a particular partition depends upon. Such reporting may prompt a user to increase the dedicated capacity of the partition before a problem arises. The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodi

DETAILED DESCRIPTION

Features of the present invention include an apparatus, program product and improved method for reporting performance data in a computer system having uncapped partitions. In an illustrative embodiment discussed below, for example, a system provides an understanding of what response times in an uncapped partition would have been had no resource been borrowed. To this end, the system described hereinafter measures and analyzes metrics, e.g., CPU and/or memory utilization, that aid in understanding what response times would have been had no resources been borrowed.

System features allow users to be proactive in recognizing how much uncapped resource utilization a particular partition depends upon. Such reporting may prompt a user to increase the dedicated capacity of the partition before a problem arises. The system may process measured metrics to understand what the response time might have been had the extra resource not been borrowed from other partitions. System analysis may include existing performance monitor data.

A system may look at each interval having CPU utilization over 100%. A thread's response time may comprise both a CPU time component and a wait time. These times may be collected by a typical performance monitor. For instance, a database monitor may provide the system and/or user with a start/stop time and job number. To determine what the CPU time component would have been without uncapped partitions, a system may take the overall measured CPU utilization for the interval and divide that by a 100% CPU limit. This process results in an increase factor. The system may then loop through all of the threads and multiply their respective CPU time components by the increase factor. The resultant product may then be added back to the wait time component. The system may then report the measured response time, measured CPU time, plus the estimated response time in the absence of uncapped partitions. To this end, the system may be configured to additionally account for wait time, surrounding intervals, as well as any priority access to resources as between respective logical partitions.

Hardware and Software Environment

Figure 1:
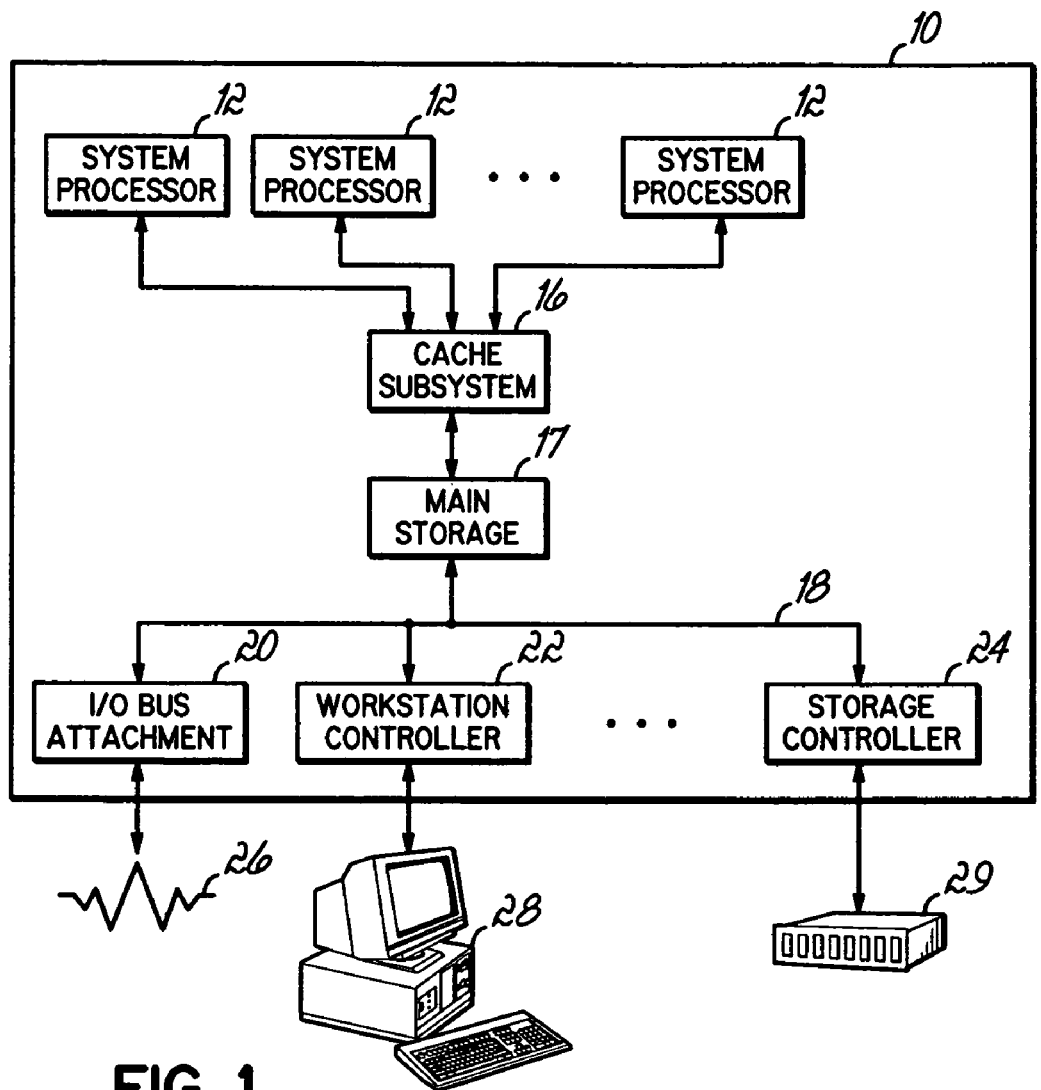
- FIG. 1 is a block diagram of a computer consistent with the invention.

Turning more particularly to the drawings, wherein like numbers denote like parts throughout the several views, FIG. 1 illustrates a data processing apparatus 10 consistent with the invention. Apparatus 10 generically represents, for example, any of a number of multi-user computer systems such as a network server, a multi-user computer, a mainframe computer, etc. However, it should be appreciated that the invention may be implemented in other data processing apparatus, e.g., in stand-alone or single-user computer systems such as workstations, desktop computers, portable computers, and the like, or in other computing devices such as embedded controllers and the like. One suitable implementation of apparatus 10 is in a midrange computer such as a pSeries or iSeries computer available from International Business Machines Corporation.

Apparatus 10 generally includes one or more physical processors 12 coupled to a memory subsystem including main storage 17, e.g., an array of dynamic random access memory (DRAM). Where desired, the physical processors may be multithreaded. Also illustrated as interposed between physical processors 12 and main storage 17 is a cache subsystem 16, typically including one or more levels of data, instruction and/or combination caches, with certain caches either serving individual processors or multiple processors as is well known in the art.

Furthermore, main storage 17 is coupled to a number of types of external (I/O) devices via a system bus 18 and a plurality of interface devices, e.g., an input/output bus attachment interface 20, a workstation controller 22 and a storage controller 24, which respectively provide external access to one or more external networks 26, one or more workstations 28, and/or one or more storage devices such as a direct access storage device (DASD) 29.

Figure 2:
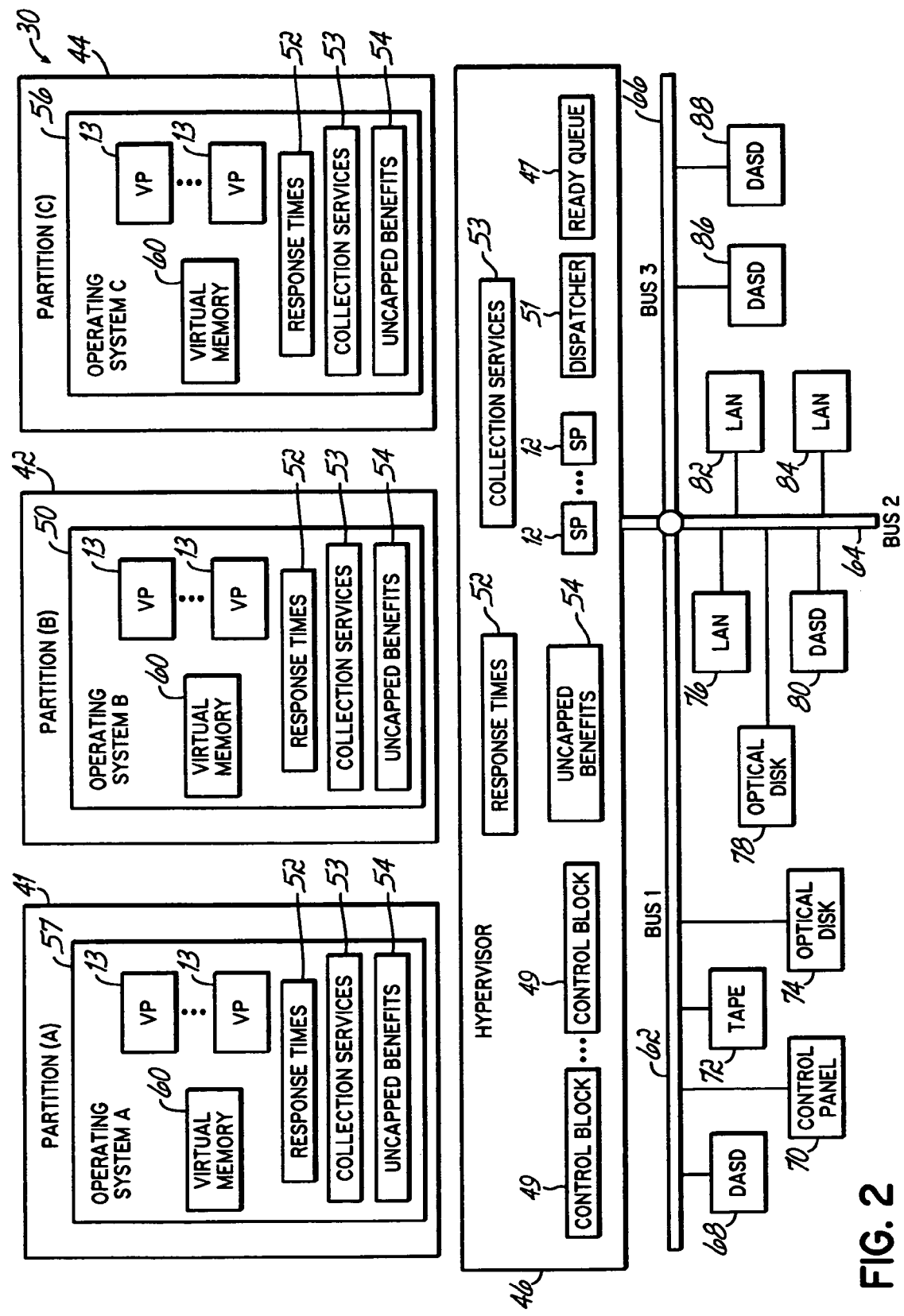
FIG. 2 is a block diagram of the primary software components and resources of the computer of FIG. 1.

FIG. 2 illustrates in greater detail the primary software components and resources utilized in implementing a logically partitioned environment consistent with the system 10 shown in FIG. 1. The system 30 of FIG. 2 includes a plurality of partitions, e.g., partitions 41, 42, 44 that share common processing resources among multiple processes. Such an architecture may rely upon a single computing machine having one or more physical processors 12, or central processing units (CPU's). The physical processors 12 may execute software configured to simulate multiple virtual processors 13.

The partitions 41, 42 and 44 in system 30 are uncapped, and may logically comprise a portion of a system's physical processors 12, a direct access storage device (DASD) 68 and other resources as assigned by an administrator. Each partition typically hosts an operating system 50, 56, 57 and may have multiple virtual processors 13. In this manner, each partition 41, 42 and 44 operates largely as if it is a separate computer.

Each partition 41, 42 and 44 may additionally include stored CPU or other response times 52, a collection services tool 53 for measuring the response times 52, and an uncapped benefits determination program 54 for determining and reporting estimated response times.

An underlying program called a hypervisor 46, or partition manager, uses this scheme to assign physical resources to each partition 41, 42 and 44. For instance, the hypervisor 46 may intercept requests for resources from operating systems 50, 56, 57 to globally share and allocate them. If the partitions 41, 42 and 44 are sharing processors, the hypervisor 46 allocates physical processor cycles between the virtual processors 13 of the partitions 41, 42 and 44 sharing the physical processor 12.

Each operating system 50, 56 and 57 controls the primary operations of its respective logical partition 41, 42 and 44 in the same manner as the operating system of a non-partitioned computer. Each logical partition 41, 42 and 44 may execute in a separate memory space, represented by virtual memory 60. Moreover, each logical partition 41, 42 and 44 is statically and/or dynamically allocated a portion of the available resources in apparatus 10. For example and as discussed herein, each logical partition may share one or more physical processors 12, as well as a portion of the available memory space for use in virtual memory 60. In this manner, a given processor may be utilized by more than one logical partition.

The hypervisor 46 may include a dispatcher 51 to manage the dispatching of virtual processors to physical processors on a dispatch list, or ready queue 47. The ready queue 47 comprises memory that includes a list of virtual processors having work that is waiting to be dispatched on a physical processor 12. The hypervisor 46 shown in FIG. 2 also includes physical processors 12, in addition to processor control blocks 49. The processor control blocks 49 comprise memory that includes a list of virtual processors waiting for access on a particular physical processor 12.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 2 illustrates, for example, three logical buses 62, 64 and 66, with a plurality of resources on bus 62, including DASD 68, a control panel 70, a tape drive 72 and an optical disk drive 74, allocated to a partition.

Bus 64, on the other hand, may have resources allocated on a resource-by-resource basis, e.g., with local area network (LAN) adaptor 76, optical disk drive 78 and DASD 80 allocated to logical partition 42, and LAN adaptors 82 and 84 allocated to logical partition 44. Bus 66 may represent, for example, a bus allocated specifically to logical partition 44, such that all resources on the bus, e.g., DASD's 86 and 88, are allocated to the same logical partition.

It will be appreciated that the illustration of specific resources in FIG. 2 is merely exemplary in nature, and that any combination and arrangement of resources may be allocated to any logical partition in the alternative. For instance, it will be appreciated by one of skill in the art that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

The various software components and resources illustrated in FIG. 2 may be implemented in a number of manners, including using various computer software applications, routines, components, programs, objects, modules, data structures, etc., referred to hereinafter as "computer programs," "programs," "tools," or "program code." Program code typically comprises one or more instructions that are resident at various times in various memory and storage devices in the computer, and that, when read and executed by one or more processors in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of computer readable medium used to actually carry out the distribution. Examples of computer readable media include, but are not limited to tangible, recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Though not shown in FIG. 2, for instance, one skilled in the art will appreciate that other partitions may be included within other embodiments, including a partition that comprises part of the hypervisor 46. This hypervisor partition functions in many ways like the conventional partitions 41, 42 and 44 (and operating systems), but has no user interface for the customer to protect it from failures that might otherwise come about through user interaction. Furthermore, one skilled in the art will appreciate that embodiments of the invention may further have application within non-partitioned environments. Moreover, while three logical partitions 41, 42 and 44 are shown in FIG. 2, one skilled in the art will appreciate that more or fewer partitions may be implemented as needed. Those skilled in the art will thus recognize that other alternative hardware and/or software environments may be used without departing from the scope of the invention.

Processes for Determining and Reporting Benefits of Uncapped Partition Use

Figure 3:
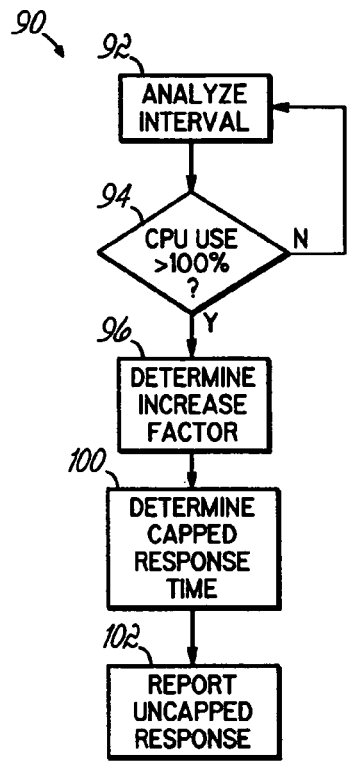
FIG. 3 is a flowchart having a set of steps executable by systems of FIGS. 1 and 2 for determining and reporting measured and expected increased response times on an interval basis.

FIG. 3 shows a flowchart 90 having steps executable by the systems of FIGS. 1 and 2 for determining and reporting measured and increased response times on an interval basis. At block 92 of FIG. 3, the system 30 initiates analysis of an interval. The length of each interval may be configurable by a system administrator (e.g., 0.25 seconds, 5 minutes, forty-eight hours, etc.).

The system 30 may determine at block 94 whether the logical partition 41 has exceeded its allotted capacity. For instance, a collection services tool 53 may determine if CPU usage for the partition 41 during the interval has exceeded 100%. The system 30 may additionally measure the actual time that the partition used the CPU for the interval. For instance, the collection tool 53 may determine at block 94 that the CPU was used 0.06 seconds on behalf of a job.

If CPU usage for the partition 41 during the interval exceeded 100%, then system 30 determines at block 96 an increase factor for the CPU time. For example, the system 30 may determine the increase factor by dividing the overall measured CPU use for the interval by the partition's allocation, e.g., 100%. Where the CPU usage measures 150% and the partition's allocation is 100%, then the increase factor is 1.5.

At block 100, the system 30 determines what the response time would have been had resources not been borrowed. The system 30 may more particularly determine what the likely response time would have been for each computer operation, e.g., each job or thread comprising part of a job. To this end, the system 30 may multiply each measured time of CPU use for a thread or job, i.e., the CPU time component, by the increase factor. Continuing with the above example, since the job used the CPU for 0.06 seconds, the estimated CPU time without uncapped features would have been 0.09 seconds. Any measured wait time may be added to the product of the factor and component to determine an estimated response time for if the partition were capped. For example, if the wait time in the above example was determined to be 3.11 (actual response time minus actual CPU use time), then 3.11 is added at block 100 to the 0.09 second product to arrive at an estimated response of 3.2 seconds. The system 30 reports the actual measured and estimated, capped response times at block 102.

Figure 4:
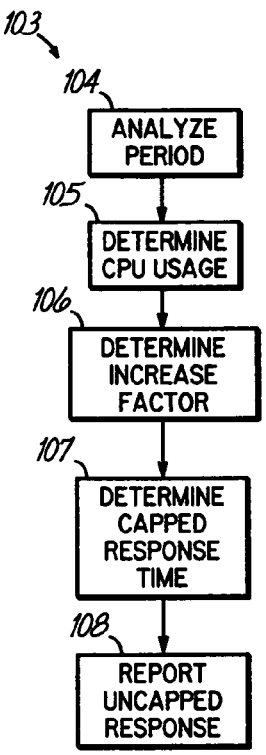
FIG. 4 is a flowchart having a set of steps executable by systems of FIGS. 1 and 2 for determining and reporting measured and expected increased response times on a period basis.

FIG. 4 shows a flowchart 103 having steps executable by systems of FIGS. 1 and 2 for determining and reporting measured and increased response times for a period of intervals. That is, response time determinations may be accomplished using a period comprising multiple intervals. At block 104 of FIG. 4, the system 30 initiates analysis of a period of intervals. The length of the period may vary as specified by a system administrator. In instances where a period of intervals is used as the basis for a determination, the intervals are generally, but need not be consecutive.

At block 105, a collection services tool 53 may determine actual CPU use, measured in seconds. The system 30 determines at block 106 an increase factor for the CPU time. For example, the system 30 may determine the increase factor by dividing (or averaging) the total CPU usage for the period by the number of intervals in the period. For instance, if a partition used 400% of it's allocated amount in a first interval of a period, and none in a second interval, then the increase factor determined at block 106 for a two interval period is two.

At block 107, the system 30 determines what the response time would have been had resources not been borrowed. The system 30 may more particularly determine what the likely response time would have been for each job or thread comprising part of a job during the period. To this end, the system 30 may multiply each measured time of CPU use for a thread or job, i.e., the CPU time component, by the increase factor. Any measured wait time may be added to the product of the factor and component to determine an estimated response time for if the partition were capped. As above, the system 30 may report the actual measured and estimated, capped response times at block 108.

Figure 5:
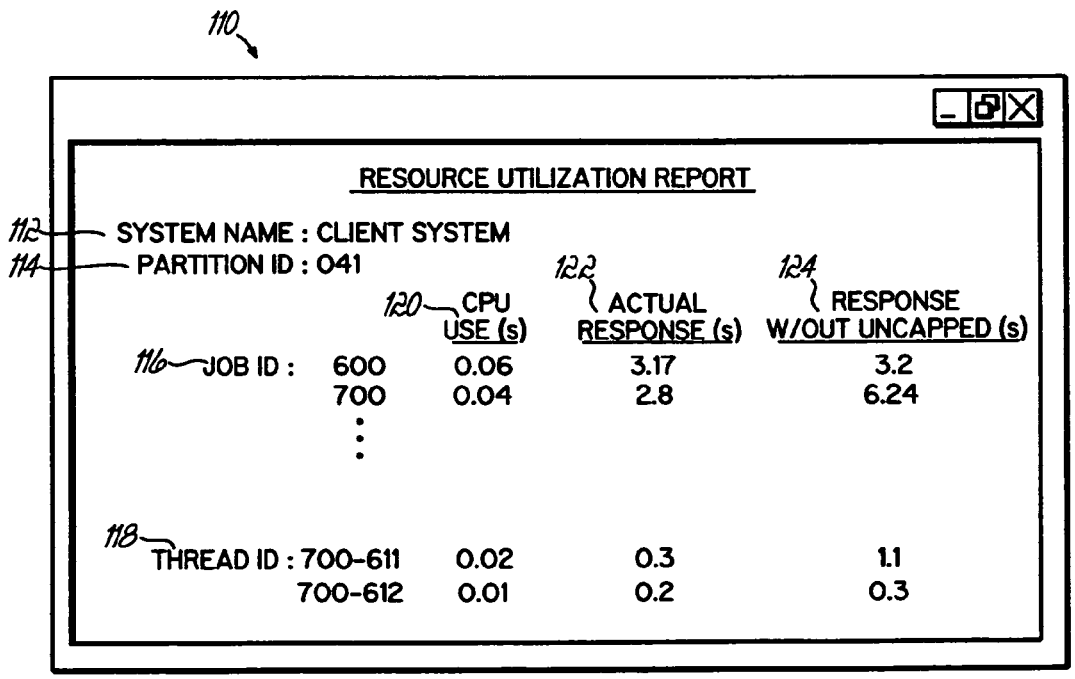
FIG. 5 shows a display reporting the measured and estimated increased response times for the interval described in FIG. 3.

FIG. 5 shows a display 110 reporting the measured and expected increased response times for the interval described in FIG. 3. More particularly, the display 100 identifies the names of the system and partition, 112 and 114, respectively, analyzed during an interval. The display 100 includes columns 120, 122 of individual job and thread activity measured during the interval. The display 100 further reports a column 124 of expected response time without uncapped partitions. The exemplary display enables a system administrator to see at a glance the benefits of uncapped partitions. For example, the response time of the above described job 600 benefited from using uncapped partition features during the interval 0.03 seconds.

One skilled in the art will recognize that other factors, in addition to the above described increase factor, for instance, may be processed to determine capped responses time. For instance, scaling factors may be used to individually adjust each thread or job based on their respective priorities. If the CPU is limited to 100% for a partition, the threads running at a lower priority would have been penalized more than those running at higher priority. To accurately estimate this effect, the system may simulate the scheduling algorithm of the operating system being run. For instance, the system may use the thread properties to proportionally adjust the CPU times of the threads. One skilled in the art will appreciate that other factors may be input and mathematically modeled such that the determination most accurately simulates the real scheduling algorithms.

While the present invention has been illustrated by a description of various embodiments and while these embodiments have been described in considerable detail, it is not the intention of the applicants to restrict, or in any way limit, the scope of the appended claims to such detail. As such, additional advantages and modifications will readily appear to those skilled in the art. For instance, an embodiment may track which particular thread, job or other operation benefited from uncapped resource borrowing by causing the hypervisor to communicate information to a running partition in order to signal when extra resources are being used. Conventionally, the hypervisor knows that a partition is running at 100% when it gives an uncapped dispatch. The hypervisor knows this because the partition must have utilized its entire capacity before it can get uncapped cycles. By communicating this information in a signal from the hypervisor to the partition, the system may identify applicable jobs and track which specific job benefited from the borrowed resources.

While the above-described embodiments have particular application in the context of processor utilization, one skilled in the art will appreciate that other computing resources, such as memory, I/O, disk, objects and other resources capable of being borrowed from partition to partition, will have equal application in embodiments of the present invention. Therefore, the metrics for these resources may change from embodiment to embodiment, accordingly. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for communicating performance attributable to using an uncapped logical partition, the method comprising:
    determining a metric relating to an actual use of a computer resource by the uncapped logical partition during performance of a computer operation that uses the computer resource, wherein determining the metric relating to the actual use by the uncapped logical partition of the computer resource during the computer operation further comprises determining the metric relating to the actual use by the uncapped logical partition of the computer resource for at least one of a thread and a job comprising multiple threads;
    determining the actual response time for the computer operation using the uncapped logical partition;
    automatically determining using the metric an estimated response time for the computer operation had a capped logical partition been used to perform the computer operation; and
    reporting information derived from the estimated response time to facilitate recognition of uncapped resource utilization upon which the uncapped logical partition depends.

2. The method of claim 1, wherein determining the estimated response time further includes determining an increase factor.

3. The method of claim 2, wherein determining the estimated response time further includes determining a product of the increase factor and the metric.

4. The method of claim 1, wherein determining the estimated response time further includes determining a wait time component.

5. The method of claim 1, wherein determining the estimated response time further includes determining a scaled weighting factor based on partition priority.

6. The method of claim 1, wherein determining the metric relating to the actual use by the uncapped logical partition of the computer resource during the computer operation further comprises determining at least one metric relating to and selected from a group consisting of:

processor usage, a processor time component, a wait time component, memory usage, an I/O resource and a disk resource.

7. The method of claim 1, wherein reporting to the user information derived from the estimated response time further includes identifying at least one of a thread and job benefiting from use of the uncapped partition.

8. The method of claim 1, wherein determining the metric relating to the actual use by the uncapped logical partition of the computer resource during the computer operation further comprises determining the metric relating to the actual use by the uncapped logical partition of the computer resource during at least one of an interval and a period comprising multiple intervals.

9. An apparatus comprising:
a hardware-implemented computer executing an uncapped logical partition; and
program code in communication with the uncapped logical partition, the program code configured to determine a metric relating to an actual use of a computer resource by the uncapped logical partition during performance of a computer operation that uses the computer resource, to determine the actual response time for the computer operation using the uncapped logical partition, to determine using the metric an estimated response time for the computer operation had a capped logical partition been used to perform the computer operation, and to report information derived from the estimated response time to facilitate recognition of uncapped resource utilization upon which the uncapped logical partition depends, wherein the program code is further configured to determine the estimated response time by determining an increase factor and determining a product of the increase factor and the metric.

10. The apparatus of claim 9, wherein the increase factor is determined by dividing a measurement of processor use for an interval by an amount of a partition's allocated processor capacity.

11. The apparatus of claim 9, wherein the increase factor is determined by dividing the total processor usage for a period by the number of intervals in the period.

12. The apparatus of claim 9, wherein the program code is further configured to determine the actual response time using at least one of a wait time component and a scaled weighting factor based on partition priority.

13. The apparatus of claim 9, wherein the computer operation comprises at least one of an interval and a period comprising multiple intervals.

14. The apparatus of claim 9, wherein the computer operation comprises at least one of a thread and a job comprising multiple threads.

15. A program product, comprising:
a non-transitory memory; and
program code stored in the non-transitory memory and in communication with an uncapped logical partition, the program code configured upon execution by at least one processor to determine a metric relating to an actual use of a computer resource by the uncapped logical partition during performance of a computer operation that uses the computer resource, to determine the actual response time for the computer operation using the uncapped logical partition, to determine using the metric an estimated response time for the computer operation had a capped logical partition been used to perform the computer operation, and to report information derived from the estimated response time to facilitate recognition of uncapped resource utilization upon which the uncapped logical partition depends, wherein the program code is configured to determine the metric relating to the actual use by the uncapped logical partition of the computer resource during the computer operation by determining the metric relating to the actual use by the uncapped logical partition of the computer resource during at least one of an interval and a period comprising multiple intervals.

16. The method of claim 1, further comprising increasing a dedicated capacity of the uncapped logical partition based upon the reported information.

17. The apparatus of claim 9, wherein the program code is further configured to increase a dedicated capacity of the uncapped logical partition based upon the reported information.

\* \* \* \* \*